United States Patent [19]
Chambers

[11] Patent Number: 5,737,596
[45] Date of Patent: Apr. 7, 1998

[54] SEQUENTIAL NUMERICAL INFORMATION ENCODER AND DECODER

[75] Inventor: Barbara Lynne Chambers, Scotts Valley, Calif.

[73] Assignee: Seagate Technology, Inc., Scotts Valley, Calif.

[21] Appl. No.: 570,141

[22] Filed: Dec. 11, 1995

[51] Int. Cl.$^6$ .................................................. G06F 17/30
[52] U.S. Cl. ................................. 395/611; 395/612
[58] Field of Search .............................. 395/611, 612, 395/621; 341/106; 364/255.7, 256.4, 955.5, 963.3

[56] References Cited

U.S. PATENT DOCUMENTS

| | | | |
|---|---|---|---|
| 4,628,298 | 12/1986 | Hafle et al. | 340/347 P |
| 4,642,793 | 2/1987 | Meaden | 364/900 |
| 4,780,816 | 10/1988 | Connell | 364/200 |

OTHER PUBLICATIONS

Sedgewick, "Algorithms", Addison–Wesley, pp. 201–210, Dec. 1983.
Reingold et al., "Data Structures", Little Brown, pp. 332–375, Dec. 1983.

Primary Examiner—Thomas G. Black
Assistant Examiner—Donald Min
Attorney, Agent, or Firm—Edward P. Heller, III; Raghunath S. Minisandram

[57] ABSTRACT

A method of encoding position information for a group of recording units on a recording medium having plurality of primary groups, with each primary group having N primary labels and plurality of secondary groups, with each secondary group having M secondary labels. The primary labels and secondary labels are always in a fixed sequence. The primary labels and secondary labels are combined such that for each position X, there is a unique combination of primary label and secondary label. Further, the value of Xth primary label differs by the quotient of X/N from the value of corresponding secondary label of the secondary group when the value of primary label is greater than or equal to the value of secondary label and the value of Xth primary label differs by M subtracted from the value of secondary label when the value of primary label is less than the value of secondary label.

30 Claims, 8 Drawing Sheets

| /10 POSITION INFORMATION DATA | /11 POSITION INFORMATION CODE |
|---|---|
| 0000 | AMBER ALPHA |
| 0001 | BLUE BETA |
| 0010 | RED THETA |
| 0011 | GREEN DELTA |
| 0100 | YELLOW ALPHA |
| 0101 | AMBER BETA |
| 0110 | BLUE THETA |
| 0111 | RED DELTA |
| 1000 | GREEN ALPHA |
| 1001 | YELLOW BETA |
| 1010 | AMBER THETA |
| 1011 | BLUE DELTA |
| 1100 | RED ALPHA |
| 1101 | GREEN BETA |
| 1110 | YELLOW THETA |
| 1111 | AMBER DELTA |

| /40 PRIMARY LABEL | /41 VALUE | /42 BINARY NUMBER |
|---|---|---|
| ALPHA | 0 | 00 |
| BETA | 1 | 01 |
| THETA | 2 | 10 |
| DELTA | 3 | 11 |

| /44 SECONDARY LABEL | /45 VALUE | /46 BINARY NUMBER |
|---|---|---|
| AMBER | 0 | 00 |
| BLUE | 1 | 01 |
| RED | 2 | 10 |
| GREEN | 3 | 11 |
| YELLOW | 4 | 100 |

/50

| /51 INPUT | /52 OUTPUT |
|---|---|
| ALPHA | 00 |
| BETA | 01 |
| THETA | 10 |
| DELTA | 11 |
| AMBER | 00 |
| BLUE | 01 |
| RED | 10 |
| GREEN | 11 |
| YELLOW | 100 |

| | | 10 | | 11 | | 50 | |
|---|---|---|---|---|---|---|---|
| | | POSITION INFORMATION DATA | | POSITION INFORMATION CODE | 51 | | 52 |
| | | | | | INPUT | | OUTPUT |
| | | 0000 | | ABEL | ABEL | | 0000 |
| | | 0001 | | BAKER | BAKER | | 0001 |
| | | 0010 | | CHARLIE | CHARLIE | | 0010 |
| | | 0011 | | DONNA | DONNA | | 0011 |
| | | 0100 | | ENGLAND | ENGLAND | | 0100 |
| | | 0101 | | FRANCE | FRANCE | | 0101 |
| | | 0110 | | GEORGE | GEORGE | | 0110 |
| | | 0111 | | HARRY | HARRY | | 0111 |
| | | 1000 | | INDIGO | INDIGO | | 1000 |
| | | 1001 | | JAPAN | JAPAN | | 1001 |
| | | 1010 | | KING | KING | | 1010 |
| | | 1011 | | LATIN | LATIN | | 1011 |
| | | 1100 | | MEXICO | MEXICO | | 1100 |
| | | 1101 | | NEWTON | NEWTON | | 1101 |
| | | 1110 | | ORANGE | ORANGE | | 1110 |
| | | 1111 | | PURPLE | PURPLE | | 1111 |

FIG. 1

| Position Information Data (10) | Position Information Code (11) |
|---|---|
| 0000 | AMBER ALPHA |
| 0001 | BLUE BETA |
| 0010 | RED THETA |
| 0011 | GREEN DELTA |
| 0100 | YELLOW ALPHA |
| 0101 | AMBER BETA |
| 0110 | BLUE THETA |
| 0111 | RED DELTA |
| 1000 | GREEN ALPHA |
| 1001 | YELLOW BETA |
| 1010 | AMBER THETA |
| 1011 | BLUE DELTA |
| 1100 | RED ALPHA |
| 1101 | GREEN BETA |
| 1110 | YELLOW THETA |
| 1111 | AMBER DELTA |

| PRIMARY LABEL (40) | VALUE (41) | BINARY NUMBER (42) |
|---|---|---|
| ALPHA | 0 | 00 |
| BETA | 1 | 01 |
| THETA | 2 | 10 |
| DELTA | 3 | 11 |

| SECONDARY LABEL (44) | VALUE (45) | BINARY NUMBER (46) |
|---|---|---|
| AMBER | 0 | 00 |
| BLUE | 1 | 01 |
| RED | 2 | 10 |
| GREEN | 3 | 11 |
| YELLOW | 4 | 100 |

| INPUT (51) | OUTPUT (52) |
|---|---|
| ALPHA | 00 |
| BETA | 01 |
| THETA | 10 |
| DELTA | 11 |
| AMBER | 00 |
| BLUE | 01 |
| RED | 10 |
| GREEN | 11 |
| YELLOW | 100 |

FIG. 2

| POSITION INFORMATION DATA /10 | POSITION INFORMATION CODE /11 |
|---|---|
| 0000 | ALPHA ALPHA |
| 0001 | BETA BETA |
| 0010 | THETA THETA |
| 0011 | DELTA DELTA |
| 0100 | GAMMA ALPHA |
| 0101 | ALPHA BETA |
| 0110 | BETA THETA |
| 0111 | THETA DELTA |
| 1000 | DELTA ALPHA |
| 1001 | GAMMA BETA |
| 1010 | ALPHA THETA |
| 1011 | BETA DELTA |
| 1100 | THETA ALPHA |
| 1101 | DELTA BETA |
| 1110 | GAMMA THETA |
| 1111 | ALPHA DELTA |

| PRIMARY LABEL /40 | VALUE /41 | BINARY NUMBER /42 |
|---|---|---|
| ALPHA | 0 | 00 |
| BETA | 1 | 01 |
| THETA | 2 | 10 |
| DELTA | 3 | 11 |

| SECONDARY LABEL /44 | VALUE /45 | BINARY NUMBER /46 |
|---|---|---|
| ALPHA | 0 | 00 |
| BETA | 1 | 01 |
| THETA | 2 | 10 |
| DELTA | 3 | 11 |
| GAMMA | 4 | 100 |

/50

| INPUT /51 | OUTPUT /52 |
|---|---|
| ALPHA | 00 |
| BETA | 01 |
| THETA | 10 |
| DELTA | 11 |
| GAMMA | 100 |

FIG. 3

| POSITION INFORMATION DATA | POSITION INFORMATION CODE |
|---|---|
| 0000 | AMBER ALPHA |
| 0001 | BLUE BETA |
| 0010 | RED THETA |
| 0011 | GREEN DELTA |
| 0100 | YELLOW ALPHA |
| 0101 | AMBER BETA |
| 0110 | BLUE THETA |
| 0111 | RED DELTA |
| 1000 | GREEN ALPHA |
| 1001 | YELLOW BETA |
| 1010 | AMBER THETA |
| 1011 | BLUE DELTA |
| 1100 | RED ALPHA |
| 1101 | GREEN BETA |
| 1110 | YELLOW THETA |
| 1111 | AMBER DELTA |

| POSITION INFORMATION DATA /10 | POSITION INFORMATION CODE /11 |
|---|---|
| 0000 | 00100 00100 |
| 0001 | 11110 11110 |
| 0010 | 00011 00011 |
| 0011 | 10000 10000 |
| 0100 | 00001 00100 |
| 0101 | 00100 11110 |
| 0110 | 11110 00011 |
| 0111 | 00011 10000 |
| 1000 | 10000 00100 |
| 1001 | 00001 11110 |
| 1010 | 00100 00011 |
| 1011 | 11110 10000 |
| 1100 | 00011 00100 |
| 1101 | 10000 11110 |
| 1110 | 00001 00011 |
| 1111 | 00100 10000 |

| PRIMARY LABEL /40 | VALUE /41 | BINARY NUMBER /42 |
|---|---|---|
| 00100 | 0 | 00 |
| 11110 | 1 | 01 |
| 00011 | 2 | 10 |
| 10000 | 3 | 11 |

| SECONDARY LABEL /44 | VALUE /45 | BINARY NUMBER /46 |
|---|---|---|
| 00100 | 0 | 00 |
| 11110 | 1 | 01 |
| 00011 | 2 | 10 |
| 10000 | 3 | 11 |
| 00001 | 4 | 100 |

| INPUT /51 | OUTPUT /50 /52 |
|---|---|
| 00100 | 00 |
| 11110 | 01 |
| 00011 | 10 |
| 10000 | 11 |
| 00001 | 100 |

FIG. 6

| POSITION INFORMATION DATA /10 | POSITION INFORMATION CODE /11 |
|---|---|
| 0000 | 00100 00100 |
| 0001 | 11110 11110 |
| 0010 | 00011 00011 |
| 0011 | 10000 10000 |
| 0100 | 00001 00100 |
| 0101 | 00100 11110 |
| 0110 | 11110 00011 |
| 0111 | 00011 10000 |
| 1000 | 10000 00100 |
| 1001 | 00001 11110 |
| 1010 | 00100 00011 |
| 1011 | 11110 10000 |
| 1100 | 00011 00100 |
| 1101 | 10000 11110 |
| 1110 | 00001 00011 |
| 1111 | 00100 10000 |

SEQUENTIAL NUMERICAL INFORMATION ENCODER AND DECODER

FIELD OF THE INVENTION

This invention generally relates to the field of encoding and decoding position information of a recording unit in a recording medium like a magnetic disc drive.

DESCRIPTION OF THE PRIOR ART

Magnetic disc drives store data in the form of magnetic flux, written and read by an inductive or magnetoresistive head. On each disk, data is organized into hundreds or thousands of concentric circles also known as tracks, with individual bits of data written exactly on the center of these tracks. Modern disc drives contain a positioning system which monitors read-back signals from certain position-encoded regions of each track, obtaining position information data which is vital to the crucial task of controlling the exact position of the read head as it either reads data on one track or moves quickly from one track to another. The position information data, like the stored data, consists of small regions of flux written to the disc during the manufacturing process.

The position information data like track number, sector number or zone number typically represented using binary code is recorded on a disk drive, using Gray code. Each position information data is encoded as a unique combination of position information code represented in Gray code using "0"'s and "1"'s. The position information code is recorded on the disk drive using two types of flux patterns, representing "0" and "1". When there is a need to retrieve position information data, the flux information is read and assembled as a Gray code number representing the position information code. Then the position information code thus assembled is converted to corresponding position information data. The decoding of position information code to corresponding position information data is accomplished by either using a look-up table or matrix multiplication. Thus, to decode sixteen position information codes, if a look-up table is used, we would need a look-up table containing sixteen entries, with each entry needing four bits for the position information. Thus, the number of entries in the look-up table will be equal to the number of position information codes recorded on the disk drive. Though Gray code may be decoded using matrix multiplication and without a look-up table, other possible encoding methods which may be used instead of Gray code may not be easily decoded using matrix multiplication. For example, if near-random labels are used instead of Gray code to encode position information data, decoding process would need a look-up table, because no simple matrix transform is possible.

As the number of tracks in a disk drive increases, the size of the look-up table increases. For example, to encode and decode 4096 unique tracks using 4096 unique binary position information codes would require a look-up table containing 4096 entries with each entry needing twelve bits. With the number of tracks per disk increasing rapidly while the actual size of the disk drive decreasing, if alternate codes are used, there is a need to improve encoding and decoding method and circuitry while reducing the size of look-up table.

SUMMARY OF THE INVENTION

Accordingly, it is an object of this invention to provide an encoding and decoding method wherein the decoding of the position information code requires a look-up table that has less entries than the total number of positions to be encoded.

The present invention in its broad form relates to a method of encoding position information for a group of recording units on a recording medium, the recording medium having at least one group of recording unit, each group of recording unit encoding X position information data. Each group of recording unit further having a predetermined number P of primary groups, each primary group having a predetermined number N of recording units. Each recording unit further having plurality of information units for recording a primary label capable of being decoded to a value indicating its position within the primary group. Each recording unit within the primary group having a primary label that is different from the primary label of every other recording unit within the same primary group, where the value of Xth primary label is designated by Px. Each group of recording unit further having plurality of secondary groups, each secondary group having a predetermined number M of recording units and M greater than N. Each recording unit of the secondary group having plurality of information units for recording a secondary label capable of being decoded to a value. The value of Xth secondary label is designated by Sx. The method of encoding position information comprising the step of combining the Xth secondary label of the secondary groups with the Xth primary label of the primary groups such that $X = Px + N(Px - Sx)/(M - N)$ when $Px$ is greater than or equal to $Sx$;

$X = Px + N(Px - Sx)/(M - N) + (M)(N)$ when $Px$ is less than $Sx$.

In a specific embodiment of the invention, when the value of M is greater than N by 1, the primary label and secondary label are combined such that the value Px of the primary label differs from the value Sx of the secondary label by the quotient of (X/N) if Px is greater than or equal to Sx. Further, the value Px of the primary label differs by (Quotient of (X/N)−M) from the value Sx of the secondary label if Px is less than Sx.

Further, the primary label of the primary group and the secondary label of the secondary group may consist of binary code, gray code or an arbitrary label having an assigned binary value.

BRIEF DESCRIPTION OF THE DRAWINGS

FIG. 1 is a diagram showing position information data encoded as position information code using arbitrary labels and corresponding look-up table needed to decode the position information code.

FIG. 2 is a diagram showing position information data encoded using arbitrary labels having an assigned value and representing binary numbers with corresponding look-up table needed to decode the position information code, according to an embodiment of the invention.

FIG. 3 is a diagram showing position information data encoded using arbitrary labels having an assigned value and representing binary numbers with corresponding look-up table needed to decode the position information code, according to an alternate embodiment of the invention.

3 ment of the invention using arbitrary labels having an assigned value and representing binary numbers as described in FIG. 3.

FIG. 6 is a diagram showing position information data encoded using arbitrary labels composed of 0's and 1's, having an assigned value and representing binary numbers with corresponding look-up table needed to decode the position information code, according to an alternate embodiment of the invention.

Figure 7:
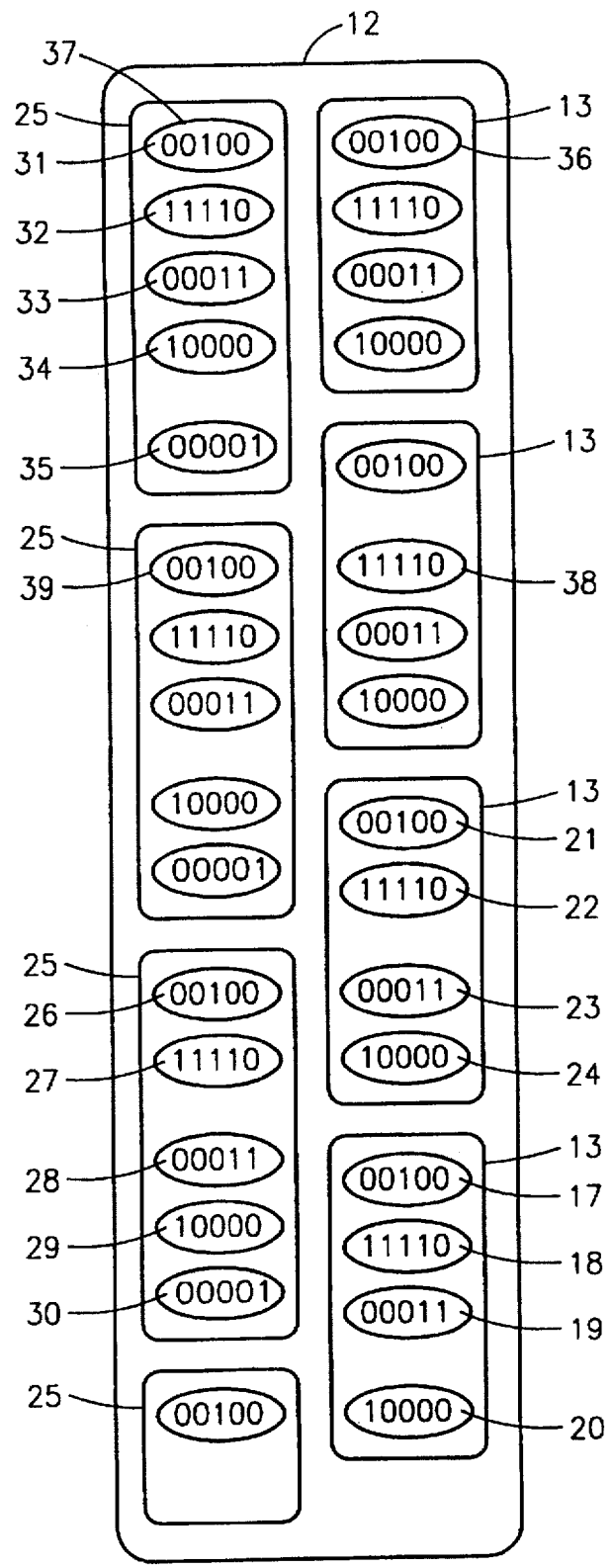

FIG. 7 is a diagram showing position information encoded on a recording medium according to an embodiment of the invention using arbitrary labels composed of 0's and 1's, having an assigned value and representing binary numbers as described in FIG. 6.

Figure 8:
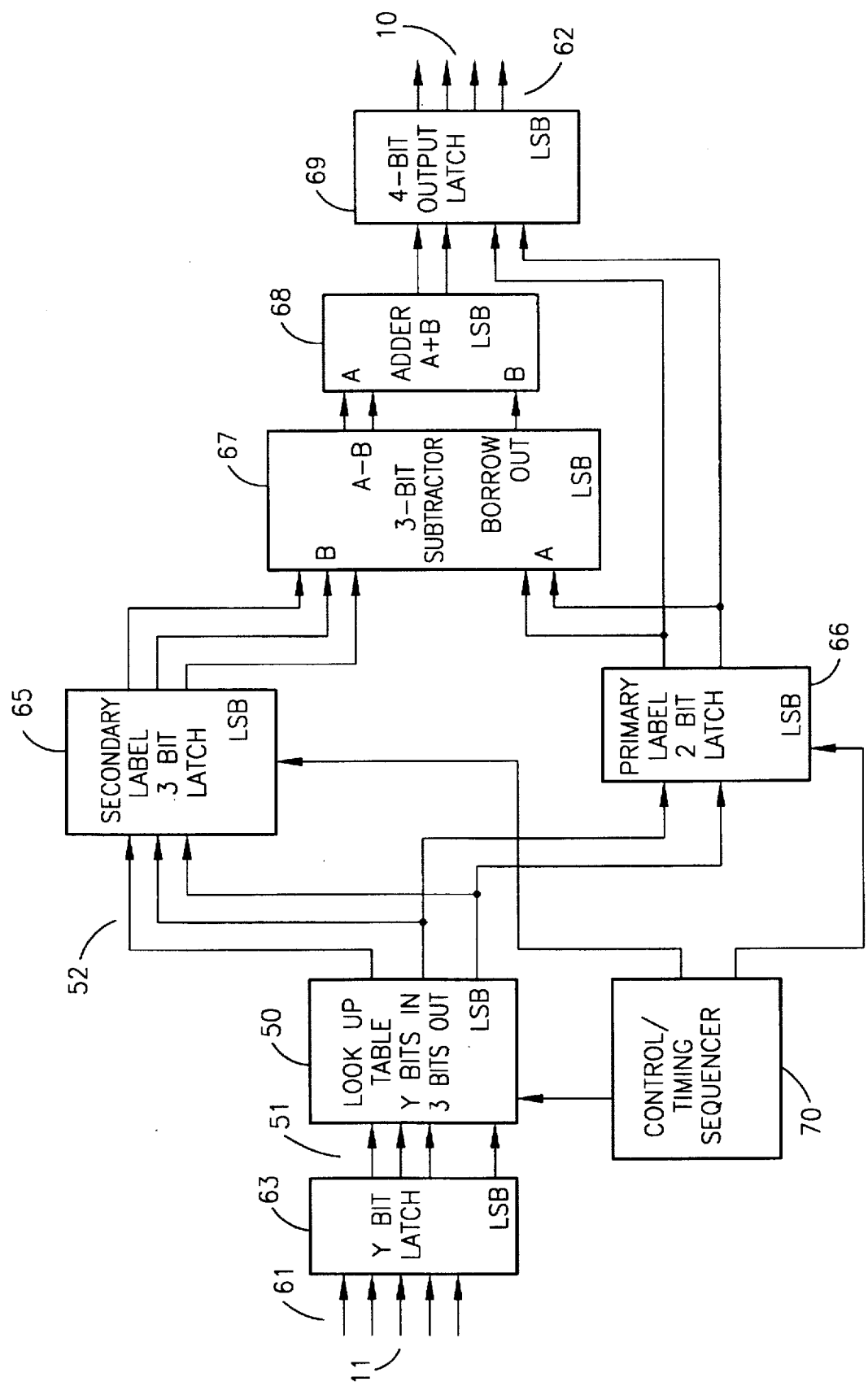

FIG. 8 is a block diagram for logical implementation of the preferred embodiment to encode and decode 16 position information codes.

DESCRIPTION OF THE PREFERRED EMBODIMENTS

Referring now to the drawings, and more particularly, to FIG. 1, there is shown sixteen position information data 10 corresponding to respective position information codes 11 using sixteen arbitrary labels. Further, look-up table 50 accepting sixteen position information codes 11 as input 51 and providing sixteen position information data 10 as output 52 is shown. When there is a need to retrieve the position information data 10, the position information code 11 is read from the recording medium. The position information code 11 so read from the recording medium is presented to the look-up table 50, as input 51. The look-up table 50 delivers as output 52, the position information data 10 corresponding to the position information code 11 that was received as input 51. For example, if the position information code 11 read from the media was INDIGO and was presented as input 51, the look-up table 50 delivers 1000 as corresponding output 52 representing corresponding position information data 10.

As it is evident from the foregoing description of FIG. 1, sixteen position information data have been encoded using sixteen position information codes of arbitrary labels. Further, in order to decode the position information code to corresponding position information data, there is a need to use a look-up table containing sixteen entries.

Referring now to FIG. 2, there is shown sixteen position information data 10 corresponding to respective position information codes 11 using sixteen arbitrary labels created using combinations of four primary labels 40 and five secondary labels 44. Further, four primary labels 40 having a value 41 and representing binary numbers 42 is shown. Five secondary labels 44 having a value 45 and representing binary numbers 46 is also shown. In this embodiment, all of the primary labels 40 are different from secondary labels 44. A look-up table 50 having nine entries, accepting four primary labels 40 and five secondary labels 44 as input 51 and providing nine binary numbers as output 52 is also shown.

Referring now to FIG. 3, there is shown sixteen position information data 10 corresponding to respective position information codes 11 using sixteen arbitrary labels created using combinations of four primary labels 40 and five secondary labels 44. Further, four primary labels 40 having a value 41 and representing binary numbers 42 is shown. Five secondary labels 44 having a value 45 and representing binary numbers 46 is also shown. In this embodiment, all four of the primary labels 40 are also used as secondary labels 44. A look-up table 50 having five entries, accepting four primary labels 40 and five secondary labels 44 as input 51 and providing five binary numbers as output 52 is also shown.

Figure 4:
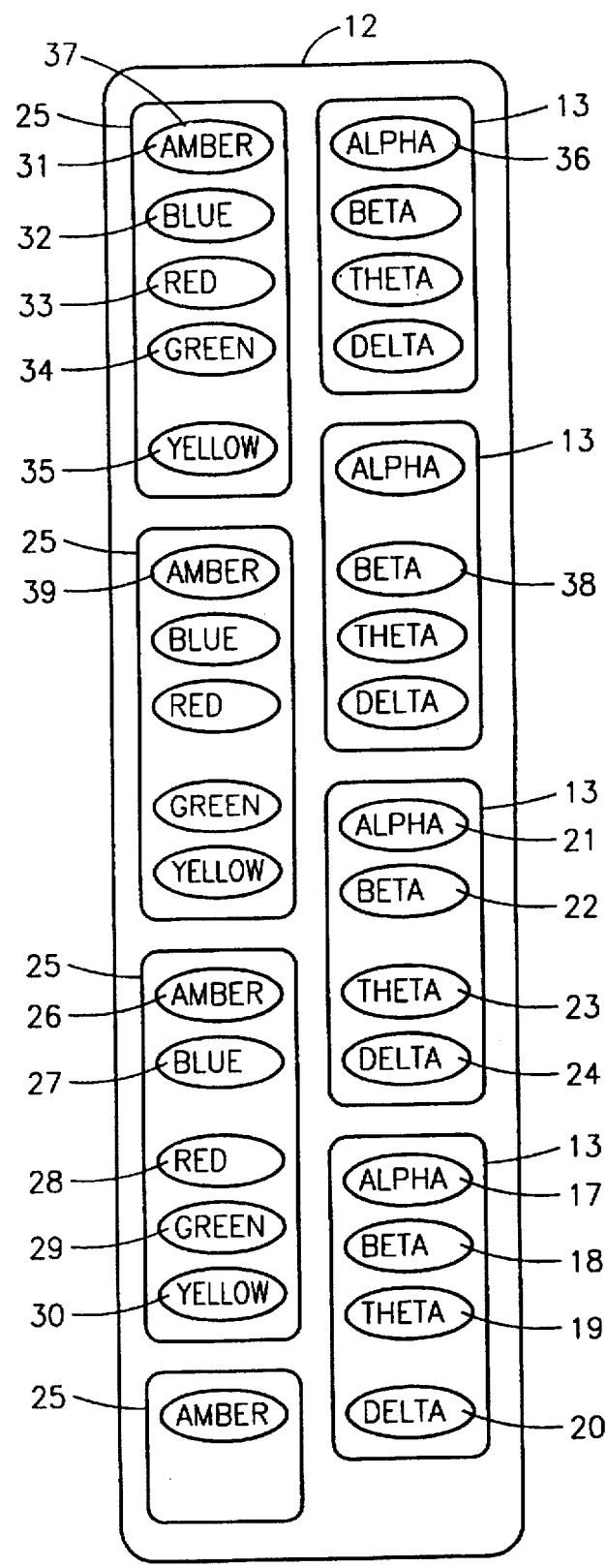
FIG. 4 is a diagram showing position information data encoded on a recording medium according to an embodiment of the invention using arbitrary labels having an assigned value and representing binary numbers as described in FIG. 2.

Referring now to FIG. 4, there is shown sixteen position information data 10 encoded as position information code 11 in one of the group of recording units 12 which comprises an alternate implementation of the preferred embodiment of the present invention using nine arbitrary labels having an assigned value and representing binary numbers as described in FIG. 2. The recording unit 12 includes four (designated as N) primary groups 13 each of which include four primary recording units 17, 18, 19 and 20.

Further, the FIG. 4 shows the primary recording unit 17 storing a label ALPHA as a primary label 21 having a value of 0 and indicating its position 0 within the primary group, the primary recording unit 18 storing a label BETA as a primary label 22 having a value of 1 and indicating its position 1 within the primary group, the primary recording unit 19 storing a label THETA as a primary label 23 having a value of 2 and indicating its position 2 within the primary group, the primary recording unit 20 storing a label DELTA as a primary label 24 having a value of 3 and indicating its position 3 within the primary group.

The recording unit 12 further includes four secondary groups 25 each of which includes five (designated as N) secondary recording units 26, 27, 28, 29 and 30, each secondary recording unit 26, 27, :28, 29 and 30 storing labels AMBER having a value of 0, BLUE having a value of 1, RED having a value of 2, GREEN having a value of 3 and YELLOW having a value of 4 as a secondary label 31, 32, 33, 34 and 35 respectively.

Further, in FIG. 4, 0th primary label is identified by legend 36 and 0th secondary label is identified by legend 37. Similarly, 5th primary label is identified by legend 38 and 5th secondary label is identified by legend 39.

Now, designating the value of Xth primary label as Px and the value of Xth secondary label as Sx, according to a preferred embodiment of the invention, the secondary labels 31, 32, 33, 34 and 35 are combined with the primary labels 21, 22, 23 and 24 such that the value Px of the primary label differs from the value Sx of the secondary label by the Quotient of the division (X/N) if Px is greater than or equal to Sx where N is the number of primary recording units. Further, the value Px of the primary label differs by M subtracted from the quotient of division (X/N) from the value Sx of the secondary label if Px is less than Sx, where M is the number of secondary recording units.

As an example, according to the preferred embodiment shown in FIG. 4, the value of 0th primary label 36 is 0. The value of 0th secondary label 37 is 0. Further, the value of primary label is equal to the value of secondary label. Accordingly, the value of 0th primary label 36 differs from the value of 0th secondary label 37 by 0, which is the quotient of the division (0/4) (i.e. quotient of the division of the value of primary label by N, the number of primary recording units).

As another example, according to the preferred embodiment shown in FIG. 4, the value of 5th primary label 38 is 0. The value of 5th secondary label 37 is 5. Further, the value of primary label is less than the value of secondary label. Accordingly, the value of 5th primary label 36 differs from the value of 5th secondary label 37 by −5, which is 5 (the value of M) subtracted from the quotient of the division (0/4) (i.e. quotient of the division of the value of primary label by N, the number of primary recording unit).

As it is evident from the foregoing description of FIG. 4, sixteen position information data have been encoded using sixteen position information codes created using nine arbitrary labels having an assigned value and representing binary numbers. To decode the position information code thus encoded needs a look-up table with only nine entries, according to the disclosed invention as against sixteen entries according to the prior art.

Figure 5:
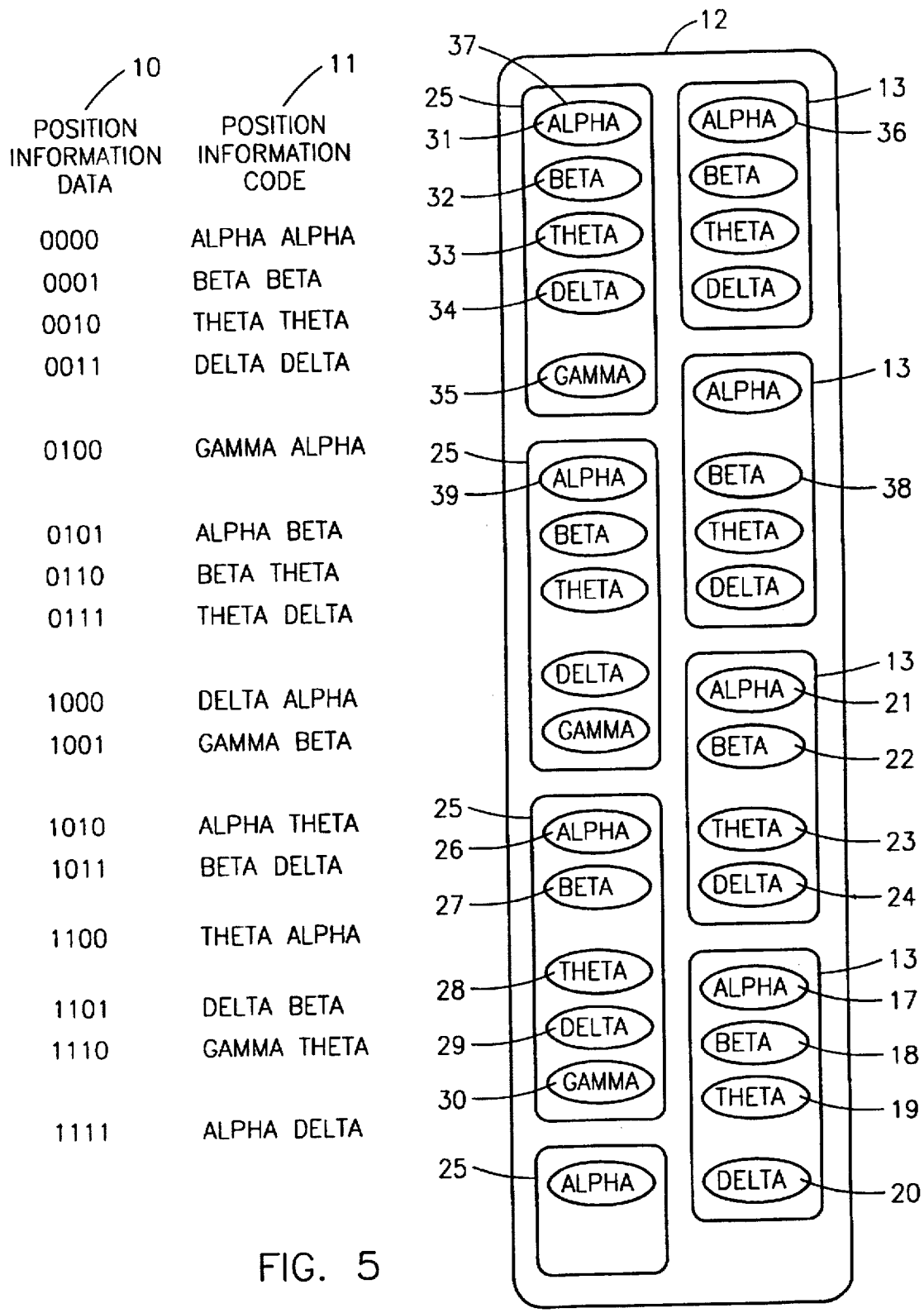
FIG. 5 is a diagram showing position information encoded on a recording medium according to an embodi-

Referring now to FIG. 5, there is shown sixteen position information data 10 encoded as position information code 11 in one of the group of recording units 12 which comprises an alternate implementation of the preferred embodiment of the present invention using five arbitrary labels having an assigned value and representing binary numbers as described in FIG. 3. The recording unit 12 includes four primary groups 13, each of which includes four (designated as N) primary recording units 17, 18, 19 and 20.

Further, the FIG. 5 shows the primary recording unit 17 storing a label ALPHA as a primary label 21 having a value of 0 and indicating its position 0 within the primary group, the primary recording unit 18 storing a label BETA as a primary label 22 having a value of 1 and indicating its position 1 within the primary group, the primary recording unit 19 storing a label THETA as a primary label 23 having a value of 2 and indicating its position 2 within the primary group, the primary recording unit 20 storing a label DELTA as a primary label 24 having a value of 3 and indicating its position 3 within the primary group.

The recording unit 12 further includes four secondary groups 25 each of which includes five (designated as M) secondary recording units 26, 27, 28, 29 and 30, each secondary recording unit 26, 27, 28, 29 and 30 storing labels ALPHA having a value of 0, BETA having a value of 1, THETA having a value of 2, DELTA having a value of 3 and GAMMA having a value of 4 as a secondary label 31, 32, 33, 34 and 35 respectively.

Further, in FIG. 5, 0th primary label is identified by legend 36 and 0th secondary label is identified by legend 37. Similarly, 5th primary label is identified by legend 38 and 5th secondary label is identified by legend 39.

Now, designating the value of Xth primary label as Px and the value of Xth secondary label as Sx, according to alternate embodiment of the invention, the secondary labels 31, 32, 33, 34 and 35 are combined with the primary labels 21, 22, 23 and 24 such that the value Px of the primary label differs from the value Sx of the secondary label by the Quotient of the division (X/N) if Px is greater than or equal to Sx where N is the number of primary recording units. Further, the value Px of the primary label differs by M subtracted from the quotient of division (X/N) from the value Sx of the secondary label if Px is less than Sx, where M is the number of secondary recording units.

As an example, according to the alternate embodiment shown in FIG. 5, the value of 0th primary label 36 is 0. The value of 0th secondary label 37 is 0. Further, the value of primary label is equal to the value of secondary label. Accordingly, the value of 0th primary label 36 differs from the value of 0th secondary label 37 by 0, which is the quotient of the division (0/4) (i.e. quotient of the division of the value of primary label by N, the number of primary recording units).

As another example, according to the preferred embodiment shown in FIG. 5, the value of 5th primary label 38 is 0. The value of 5th secondary label 39 is 5. Further, the value of primary label is less than the value of secondary label. Accordingly, the value of 5th primary label 38 differs from the value of 5th secondary label 39 by −5, which is 5 (the value of M) subtracted from the quotient of the division (0/4) (i.e. the quotient of the division of the value of primary label by N the number of primary recording units).

As it is evident from the foregoing description of FIG. 5, sixteen position information data have been encoded using sixteen position information codes created using five arbitrary labels having an assigned value and representing binary numbers. To decode the position information code thus encoded needs a look-up table with only five entries, according to the disclosed invention as against sixteen entries according to the prior art.

Referring now to FIG. 6, there is shown sixteen position information data 10 corresponding to respective position information codes 11 using sixteen arbitrary labels composed of 0's and 1's, created using combinations of four primary labels 40 and five secondary labels 44. Further, four primary labels 40 having a value 41 and representing binary numbers 42 is shown. Five secondary labels 44 having a value 45 and representing binary numbers 46 is also shown. In this embodiment, all four of the primary labels 40 are also used as secondary labels 44. A look-up table 50 having five entries, accepting four primary labels 40 and five secondary labels 44 as input 51 mad providing five binary numbers as output 52 is also shown.

Referring now to FIG. 7, there is shown sixteen position information data 10 encoded as position information code 11 in one of the group of recording units 12 which comprises an alternate implementation of the preferred embodiment of the present invention using five arbitrary labels composed of 0's and 1's, having an assigned value mad representing binary numbers as described in FIG. 6. The recording unit 12 includes four primary groups 13, each of which includes four (designated as N) primary recording units 17, 18, 19 and 20.

Further, the FIG. 7 shows the primary recording unit 17 storing a label 00100 as a primary label 21 having a value of 0 and indicating its position 0 within the primary group, the primary recording unit 18 storing a label 11110 as a primary label 22 having a value of 1 and indicating its position 1 within the primary group, the primary recording unit 19 storing a label 00011 as a primary label 23 having a value of 2 and indicating its position 2 within the primary group, the primary recording unit 20 storing a label 10000 as a primary label 24 having a value of 3 and indicating its position 3 within the primary group.

The recording unit 12 further includes four secondary groups 25 each of which includes five (designated as M) secondary recording units 26, 27, 28, 29 and 30, each secondary recording unit 26, 27, 28, 29 and 30 storing label 00100 having a value of 0, label 11110 having a value of 1, label 00011 having a value of 2, label 10000 having a value of 3 and label 00001 having a value of 4 as a secondary label 31, 32, 33, 34 and 35 respectively.

Further, in FIG. 7, 0th primary label is identified by legend 36 and 0th secondary label is identified by legend 37. Similarly, 5th primary label is identified by legend 38 and 5th secondary label is identified by legend 39.

Now, designating the value of Xth primary label as Px and the value of Xth secondary label as Sx, according to alternate embodiment of the invention, the secondary labels 31, 32, 33, 34 and 35 are combined with the primary labels 21, 22, 23 and 24 such that the value Px of the primary label differs from the value Sx of the secondary label by the Quotient of the division (X/N) if Px is greater than or equal to Sx where N is the number of primary recording units.

Further, the value Px of the primary label differs by M subtracted from the quotient of division (X/N) from the value Sx of the secondary label if Px is less than Sx, where M is the number of secondary recording units.

As an example, according to the alternate embodiment shown in FIG. 7, the value of 0th primary label 36 is 0. The value of 0th secondary label 37 is 0. Further, the value of primary label is equal to the value of secondary label. Accordingly, the value of 0th primary label 36 differs from the value of 0th secondary label 37 by 0, which is the quotient of the division (0/4) (i.e. quotient of the division of the value of primary label by N, the number of primary recording units).

As another example, according to the preferred embodiment shown in FIG. 7, the value of 5th primary label 38 is 0. The value of 5th secondary label 39 is 5. Further, the value of primary label is less than the value of secondary label. Accordingly, the value of 5th primary label 38 differs from the value of 5th secondary label 39 by −5, which is 5 (the value of M) subtracted from the quotient of the division (0/4) (i.e. the quotient of the division of the value of primary label by N the number of primary recording units).

As it is evident from the foregoing description of FIG. 7, sixteen position information data have been encoded using sixteen position information codes created using five arbitrary labels composed of 0's and 1's, having an assigned value and representing binary numbers. To decode the position information code thus encoded needs a look-up table with only five entries, according to the disclosed invention as against sixteen entries according to the prior art.

Referring again to FIG. 4, the position encoded to data 10 is decoded from the encoded position information code 11 from one of the group of recording units 12 by a) determining the binary representation of position 0, 1, 2 or 3 of the primary labels 21, 22, 23 or 24 respectively within the primary group 13 by determining the value of the primary labels 21, 22, 23, or 24; then b) subtracting the value of secondary label 31, 32, 33, 34 or 35 from the value of primary label 21, 22, 23 or 24, multiplying the resulting number by four, the number of primary recording units and then adding the value of the primary label 21, 22, 23 or 24 respectively, when the value of primary label 21, 22, 23 or 24 is greater than or equal to the value of secondary label 31, 32, 33, 34 or 35 else c) subtracting the value of secondary label 31, 32, 33, 34 or 35 from the value of primary label 21, 22, 23 or 24 and adding five, the number of secondary labels, to the resulting number; then multiplying the resulting number of previous addition by four, the number of primary labels and then adding the value of primary label 21, 22, 23 or 24 respectively, when the value of primary label 21, 22, 23 or 24 is less than the value of secondary label 31, 32, 33, 34 or 35.

For example, referring to FIG. 4 and FIG. 2 again, the encoded position information code 11 represented by the combination of the primary label identified by legend 36 and secondary label identified by 37, is decoded to corresponding position information data 10 by a) determining the binary value of the primary label ALPHA is as 00 by using the lookup table 50; then b) subtracting the binary value 00 of the secondary label AMBER from the binary value of the primary label AMBER being 00, then multiplying the resulting binary number 00 by binary 100, the number of primary recording units and then adding the binary value 00 of the primary label resulting in a position information data of binary 0000.

As another example, referring to FIG. 4 and FIG. 2 again, the encoded position information code 11 represented by the combination of the primary label identified by legend 38 and secondary label identified by 39 is decoded to corresponding position information data 10 by a) determining the value of the primary label ALPHA as binary 00 by using the lookup table 50; then b) subtracting the binary value 100 of the secondary label AMBER from the binary value of the primary label AMBER being 00, then adding binary 101, the number of secondary recording units and then multiplying the resulting number 001 by binary 100, the number of primary recording units and then adding the value 00 of the primary label resulting in a position information data of 0100.

Similarly, the position information data 10 can be decoded from the encoded position information code 11 from one of the group of recording unit 12 as described in FIG. 5 and FIG. 7, using the same steps as described previously, for decoding position information data 10 from encoded position information code 11 from one of the group of recording unit 12 as shown in FIG. 4.

Referring now to figures and more particularly to FIG. 8 there is shown a block diagram for logical implementation of the preferred embodiment to encode and decode 16 position information codes as described in FIG. 3. Encoded position information code 11 is received from the recording medium and presented to data bus 61 as corresponding primary label and secondary label and decoded 4 bit position information data 10 is available as output at data bus 62. The primary label and secondary label of position information code 11 is inputted to Y bit latch 63 with Y bits sufficient to store any of the primary label or secondary label. Y bit latch 63 presents this data to a lookup table 50 accepting Y bit data as input 51 and delivering 3 bit data as output 52. All three bits of output 52 of lookup table 50 are received by a 3 bit secondary label latch 65 when look up table 50 receives a secondary label as input and appropriately latched into secondary label latch 65 by an enabling signal from a control/timing sequencer 70. Least significant 2 bits of the output 52 of look up table 50 are fed to a 2 bit primary label latch 66 when look up table 50 receives a primary label and appropriately latched into the primary label latch 66 by an enabling signal from the control/timing sequencer 70. A 3-bit subtractor 67 having A and B input receives the output of 3 bit secondary label latch 65 as B input and the output of 2 bit primary label latch 66 as A input. An adder 68 having A and B input receives the (A−B) output of 3 bit subtractor 67 as A input and the Borrow out from 3-bit subtractor 67 as B input. A 4 bit output latch 69 receives the output of primary label latch 66 as the least significant two bits of input and receives the output of adder 68 as the two most significant bits of input. The decoded 4-bit position information data 10 is available as output of 4 bit output latch at databus 62.

The primary labels and secondary labels in the above description of preferred embodiments can be any identifiable signal, word or bit stream which has an assigned value and represents a position in a group. Even though the examples show encoding of sixteen position information data, a combination of four primary labels and five secondary labels provide twenty possible unique combinations of primary labels and secondary labels, which can be used to encode twenty position information data. Further the above invention can be used in any encoding application that represents information data that is either position dependent or time dependent.

From the above description, it is apparent that many modifications and variations of the present invention are possible in light of the above teachings. It is therefore to be understood that, within the scope of the appended claims, the invention may be practiced otherwise than as specifically described hereinabove.

I claim:

1. A method of encoding position information for a group of recording units on a recording medium, the recording medium having at least one group of recording unit encoding X position information data, each group of recording unit having a plurality of primary groups, each of said primary group having a predetermined number N of primary recording units, each said primary recording unit having a plurality of information units for recording a primary label, said primary recording unit within said primary group having a primary label that differs from the primary label of every other primary recording unit within said primary group;

plurality of secondary groups having a predetermined number M of secondary recording units, M being larger than N, each of said secondary recording unit having a plurality of information units for recording a secondary label;

the method of encoding position information data comprising the steps of:

assigning a value to each said primary label indicating its position within said primary group;

assigning a value to each said secondary label and forming a position information code for each position X of said group of recording unit by combining a primary label and a secondary label such that at Xth position, the value of said primary label differs by the quotient of the division X/N from the value of said secondary label if the value of said primary label is greater than or equal to the value of said secondary label else the value of said Xth primary label differs by M subtracted from the quotient of the division X/N from the value of said secondary label if the value of said primary label is less than the value of said secondary label.

2. The method of encoding position information according to claim 1, wherein said primary labels and secondary labels are composed of combinations of "0" and "1".

3. The method of encoding position information according to claim 1, wherein said information units are bits.

4. The method of encoding position information according to claim 1, wherein said primary labels and said secondary labels are pseudo-random labels.

5. The method of encoding position information according to claim 1, wherein N the number of primary recording units of said primary group is "1" less than M the number of secondary recording units of said secondary group.

6. The method of encoding position information according to claim 1, wherein at least one of the primary labels of said primary group is identical to one of the secondary labels of said secondary group.

7. A method of decoding position information from a group of recording units on a recording medium, the recording medium having at least one group of recording unit encoding X position information data, each group of recording unit having a plurality of primary groups, each of said primary group having a predetermined number N of primary recording units, each said primary recording unit having a plurality of information units for recording a primary label, said primary label having a value indicating its position within said primary group, said primary recording unit within said primary group having a primary label that differs from the primary label of every other primary recording unit within said primary group;

plurality of secondary groups having a predetermined number M of secondary recording units, M being larger than N, each of said secondary recording unit having a plurality of information units for recording a secondary label, said secondary label having a value;

a position information code for each position X formed by the combination of a primary label and a secondary label.

the method of decoding Xth position information data at each position of X from said position information code including the steps of:

determining the position of the primary label of said position information code within said primary group by determining the value of said primary label;

determining the value of said secondary label of said position information code;

If the value of said primary label is greater than or equal to the value of said secondary label then subtracting the value of said secondary label from the value of said primary label;

multiplying by N and adding the value of said primary label to the result of said multiplication else subtracting the value of said secondary label from the value of said primary label and adding M;

multiplying by N and adding the value of said primary label to the result of said multiplication.

8. The method of decoding position information according to claim 7, wherein said primary labels and said secondary labels are composed of combinations of "0" and "1".

9. The method of decoding position information according to claim 7, wherein said information units are bits.

10. The method of decoding position information according to claim 7, wherein said information units are pseudo-random labels.

11. The method of decoding position information according to claim 7, wherein N the number of primary recording units of said primary group is "1" less than M the number of secondary recording units of said secondary group.

12. The method of decoding position information according to claim 7, wherein at least one of the primary labels of said primary group is identical to one of the secondary labels of said secondary group.

13. A recording medium having at least one group of recording unit encoding X position information data, each group of recording unit comprising:

a plurality of primary groups, each of said primary group having a predetermined number N of primary recording units, each said primary recording unit having a plurality of information units for recording a primary label, said primary label having a value indicating its position within said primary group, said primary recording unit within said primary group having a primary label that differs from the primary label of every other primary recording unit within said primary group;

plurality of secondary groups having a predetermined number M of secondary recording units, M being larger than N, each of said secondary recording unit having a plurality of information units for recording a secondary label, said secondary label having a value, the Xth secondary label combined with Xth primary label to form a position information code at each position X such that:

the value of said Xth primary label differs by the quotient of the division X/N from the value of said Xth secondary label if the value of said primary label is greater than or equal to the value of said secondary label; and the value of said Xth primary label differs by M subtracted from the quotient of the division X/N from the value of said secondary label if the value of said primary label is less than the value of said secondary label.

14. The recording medium according to claim 13, wherein said primary labels and said secondary labels are composed of combinations of "0" and "1".

15. The recording medium according to claim 13, wherein said information units are bits.

16. The recording medium according to claim 13, wherein N the number of primary recording units of said primary group is "1" less than M the number of secondary recording units of said secondary group.

17. The recording medium according to claim 13, wherein at least one of the primary labels of said primary group is identical to one of the secondary labels of said secondary group.

18. The recording medium according to claim 13, wherein none of the primary labels of said primary group is equal to any of the secondary labels of said secondary group.

19. A method of encoding position information for a group of recording units on a recording medium, the recording medium having at least one group of recording unit encoding X position information data, each group of recording unit having a plurality of primary groups, each of said primary group having a predetermined number N of primary recording units, each said primary recording unit having a plurality of information units for recording a primary label, said primary recording unit within said primary group having a primary label that differs from the primary label of every other primary recording unit within said primary group;

plurality of secondary groups having a predetermined number M of secondary recording units, each of said secondary recording unit having a plurality of information units for recording a secondary label;

the method comprising the step of:
assigning a value to each said primary label indicating its position within said primary group and designating the value of Xth primary label as Px;
assigning a value to each said secondary label and designating the value of Xth secondary label as Sx;
combining the Xth secondary label of said secondary group with Xth primary label of said primary group at each position X to form a position information code such that
Px+N(Px−Sx)/(M−N)=X when Px is greater than or equal to Sx; else
Px+N(Px−Sx)/(M−N)+M.N=X when Px is less than Sx.

20. The recording medium according to claim 19, wherein said primary labels and said secondary labels are composed of combinations of "0" and "1".

21. The recording medium according to claim 19, wherein said information units are bits.

22. The recording medium according to claim 19, wherein N the number of primary recording units of said primary group is "1" less than M the number of secondary recording units of said secondary group.

23. The recording medium according to claim 19, wherein at least one of the primary labels of said primary group is identical to one of the secondary labels of said secondary group.

24. The recording medium according to claim 19, wherein none of the primary labels of said primary group is identical to any of the secondary labels of said secondary group.

25. A method of decoding position information for a group of recording units on a recording medium, the recording medium having at least one group of recording unit encoding X position information data, each group of recording unit having a plurality of primary groups, each of said primary group having a predetermined number N of primary recording units, each said primary recording unit having a plurality of information units for recording a primary label, said primary label having a value indicating its position within said primary group, said primary recording unit within said primary group having a primary label that differs from the primary label of every other primary recording unit within said primary group, the value of Xth primary label designated by Px;

plurality of secondary groups having a predetermined number M of secondary recording units, each of said secondary recording unit having a plurality of information units for recording a secondary label, said secondary label having a value, the value of Xth secondary label designated by Sx;

a position information code for each position X formed by the combination of a primary label and a secondary label, the method of decoding each position information data X comprising the steps of:
determining the value of Px from the primary label of said position information code;
determining the value of Sx from the secondary label of said position information code;
computing the value of X as
Px+N(Px−Sx)/(M−N) if Px is greater than or equal to Sx; else
Px+N(Px−Sx)/(M−N)+M.N if Px is less than Sx.

26. The recording medium according to claim 25, wherein said primary/labels and said secondary labels are composed of combinations of "0" and "1".

27. The recording medium according to claim 25, wherein said information units are bits.

28. The recording medium according to claim 25, wherein N the number of primary recording units of said primary group is "1" less than M the number of secondary recording units of said secondary group.

29. The recording medium according to claim 25, wherein at least one of the primary labels of said primary group is identical to one of the secondary labels of said secondary group.

30. The recording medium according to claim 25, wherein none of the primary labels of said primary group is identical to any of the secondary labels of said secondary group.

* * * * *